Figure 1:
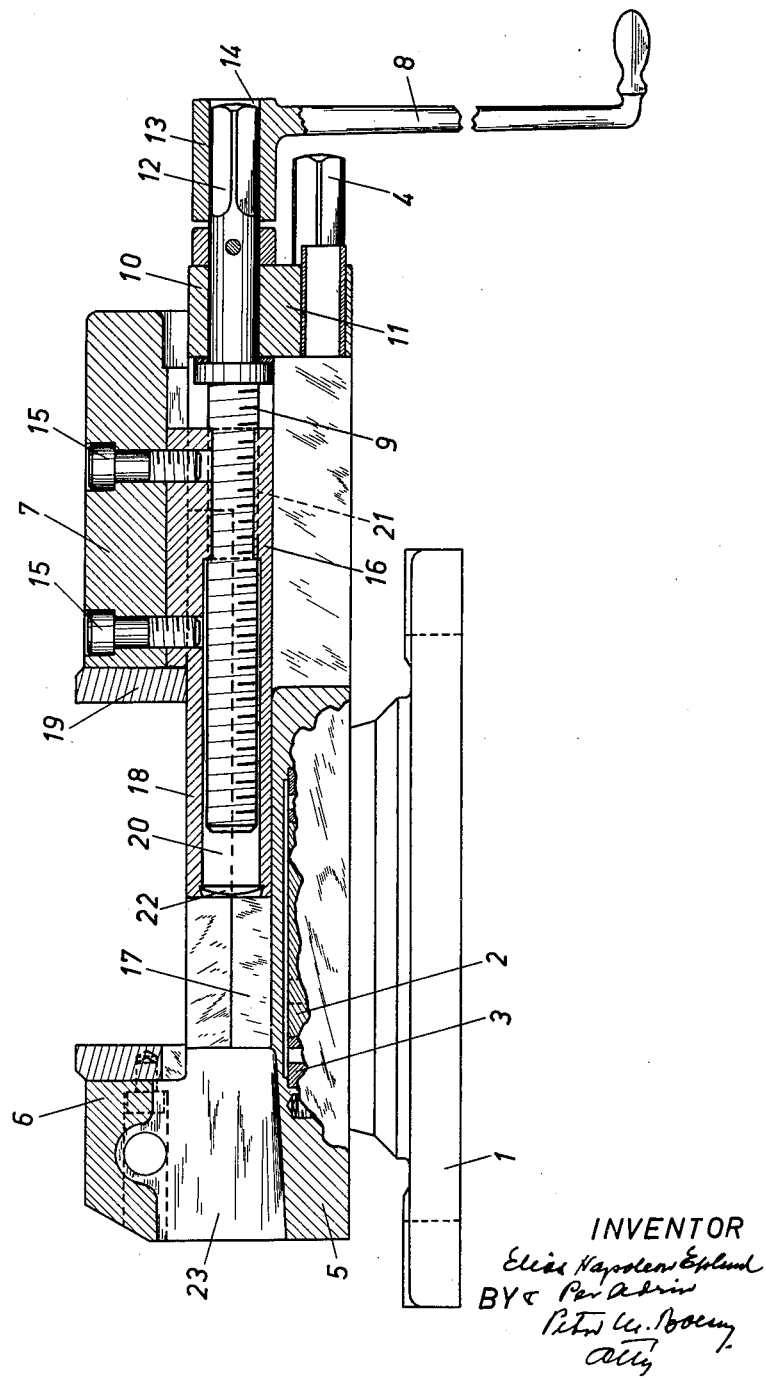

May 8, 1962  E. N. EKLUND ET AL  3,033,560
MACHINE-TOOL VISES

Filed May 11, 1960  2 Sheets-Sheet 1

INVENTOR

May 8, 1962 E. N. EKLUND ET AL 3,033,560
MACHINE-TOOL VISES
Filed May 11, 1960 2 Sheets-Sheet 2
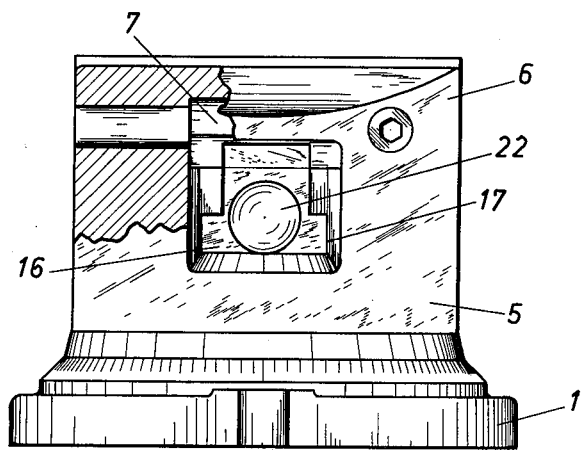
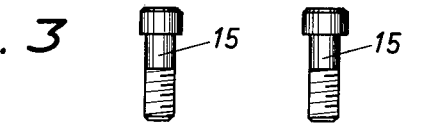
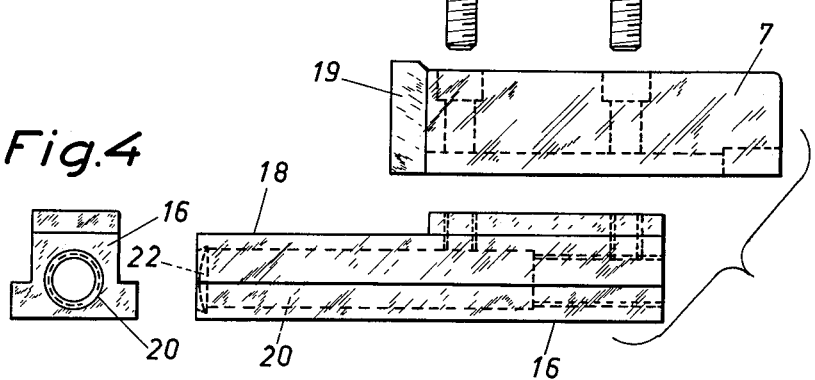
INVENTOR 3,033,560
MACHINE-TOOL VISES
Elias Napoleon Eklund, Stockholm, and Per Aldrin, Johanneshov, Sweden, assignors to ABEN Eklunds Mekaniska Verkstad, Stockholm, Sweden, a corporation of Sweden
Filed May 11, 1960, Ser. No. 28,397
Claims priority, application Sweden May 16, 1959
3 Claims. (Cl. 269—240)

This invention refers to machine-tool vises having their bodies provided with two jaws, one being fixed to the body and the other one provided with a slide by means of which the last mentioned jaw is movable toward and away from said fixed jaw by means of a screw spindle extending through said slide in a guide extending in the longitudinal direction of said spindle.

The main feature of the invention is that the movable jaw extends beyond the clamping surface of the latter in the direction towards said fixed jaw, the latter being provided with an aperture for taking up the outstanding portion of the slide when the movable jaw approaches said fixed jaw and that said spindle is turnably but axially immovably journalled in said body and further that the threaded part of said spindle extends through a portion of said slide having corresponding inner threads.

Due to the fact that the slide on the movable jaw is arranged in this way the latter is extremely well guided in the body of the vise also when said body is rather short. The invention renders possible a construction of rather short, non-spacious vises with a rather great clamping gap between its jaws.

According to a suitable embodiment, the inner end of the screw spindle is completely hidden in the interior of the slide, the threads of the spindle thereby being effectively protected against metal chips or similar debris from the work piece.

The invention will now be elucidated with the reference to the embodiment shown in the accompanying drawings. In the drawings:

FIG. 1 is a partly sectional and longitudinal side elevation of a machine-tool vise according to the invention, FIG. 2 is a partly sectional end elevation of the vise seen from the left in FIG. 1, FIG. 3 is an exploded view of the movable jaw with its slide, and FIG. 4 is an end elevation seen from the left of the slide according to FIG. 3.

In the embodiment shown in the drawings the machine-tool vise comprises a bottom plate 1 having a central part 2 which is attached to the bottom plate 1 by means of numerous bolts. The central part 2 has conical shape and its mantle surface has a diameter which decreases towards the bottom plate. The central piece 2 is further surrounded by a slotted clamping ring 3. The latter can by means of a clamping screw 4 be tightened around the central part 2 and thereby clamp the body 5 of the vise to the bottom plate 1 in the desired angle position.

The body 5 is provided with two jaws 6, 7, the jaw 6 being stationary and the jaw 7 being movable in the direction toward and away from the stationary jaw 6 by means of a screw spindle 9 which can be rotated by means of a crank 8. The screw spindle 9 is rotatably but axially immovably journalled in a bearing 10 in the body 5. The bearing 10 comprises simply a bore in the front wall 11 of the body 5. The outer end of the screw spindle 9 is provided with a square head 12 and the hub 13 of the crank 8 is provided with a corresponding axial notch 14.

The movable jaw 7 is by means of two bolts 15 fixed to a slide 16 of inverted T-shaped cross section which can be moved along in an upwardly open and undercut guide or slot 17 in the body 5 and extending in the longitudinal direction of the body 5. The slide 16 extends with a portion 18 in front of the clamping surface 19 of the jaw 7. A bore 20 extends completely through the slide and has at its portion situated adjacent the spindle head 12 inner threads 21 meshing with the threads of the screw spindle 9. The end of the bore 20 situated close to the stationary jaw 6 is provided with a cover 22.

The slide 16 is arranged in such a way that when the movable jaw 7 is in its completely retracted position, the screw spindle 9 is completely hidden in the interior of the bore 20. When the jaw 7 is moved towards the jaw 6, the slide 16 enters with the portion 18 into a bore 23 in last mentioned jaw. This bore is dimensioned in such a way that the slide 16 upon removal of the jaw 7 can pass out through the bore. Hereby, it is rendered possible to clean the sliding surfaces of the guide 17 when required. Any cleaning of the screw spindle 9 is probably never necessary as the threads of the same are completely protected in the interior of the slide 16.

It is obvious especially from FIG. 1 that broad or long work pieces may be clamped between the jaws 6, 7 although the vise is rather short.

The present invention has been described in detail above for purposes of illustration only and is not intended to be limited by this description or otherwise except as defined in the appended claims.

What we claim is:

1. A machine-tool vise having a body and two jaws provided with respective gripping surfaces, one jaw being fixed to the body and the other movable and having a longitudinal slide, a screw spindle passing in threaded engagement with and through said slide to move the movable jaw toward and away from said fixed jaw; said body being provided with guide means for the slide and extending in the general longitudinal direction of said screw spindle, said slide on the movable jaw extending beyond the clamping surface of the last mentioned jaw in the direction toward the fixed jaw, the latter having a bore open at each end for receiving the projecting portion of the slide when said movable jaw approaches said fixed jaw and the expelling of debris tending to collect in advance of the slide, and said screw spindle being turnably but axially immovably journalled in said body of the vise.

2. A machine-tool vise having a body and two jaws, provided with respective gripping surfaces, one jaw being fixed to the body and the other movable and having a longitudinal slide, a screw spindle passing in threaded engagement with and through said slide to move the movable jaw toward and away from said fixed jaw; said body being provided with guide means for the slide and extending in the general longitudinal direction of said screw spindle, said slide on the movable jaw extending beyond the clamping surface of the last mentioned jaw in the direction toward the fixed jaw, the latter having a bore open at each end for receiving the projecting portion of the slide when said movable jaw approaches said fixed jaw and the expelling of debris tending to collect in advance of the slide, and said screw spindle being turnably but axially immovably journalled in said body of the vise, said slide being of inverted T-shape in cross section; the body being provided with an upwardly open undercut slot conforming to the shape of the slide and engaging therewith to form said guide means.

3. A machine-tool vise having a body and two jaws, provided with respective gripping surfaces, one jaw being fixed to the body and the other movable and having a longitudinal slide, a screw spindle passing in threaded engagement with and through said slide to move the movable jaw toward and away from said fixed jaw; said body being provided with guide means for the slide and extending in the general longitudinal direction of said screw spindle, said slide on the movable jaw extending beyond the clamping surface of the last mentioned jaw in the direction toward the fixed jaw, the latter having a bore open at each end for receiving the projecting portion of the slide when said movable jaw approaches said fixed jaw and the expelling of debris tending to collect in advance of the slide, and said screw spindle being turnably but axially immovably journalled in said body of the vise, said bore being of sufficient diameter to permit longitudinal movement of the slide and spindle therethrough.

References Cited in the file of this patent

UNITED STATES PATENTS

| | | |
|---|---|---|
| 91,068 | Backus | June 8, 1869 |
| 1,406,981 | Cumner | Feb. 21, 1922 |
| 1,558,742 | Maszczyk | Oct. 27, 1925 |

FOREIGN PATENTS

| | | |
|---|---|---|
| 541,033 | Germany | Jan. 5, 1932 |